May 8, 1923.
C. N. BRACKETT
FILLING DEVICE
Filed Nov. 14, 1921
1,454,208
2 Sheets-Sheet 1
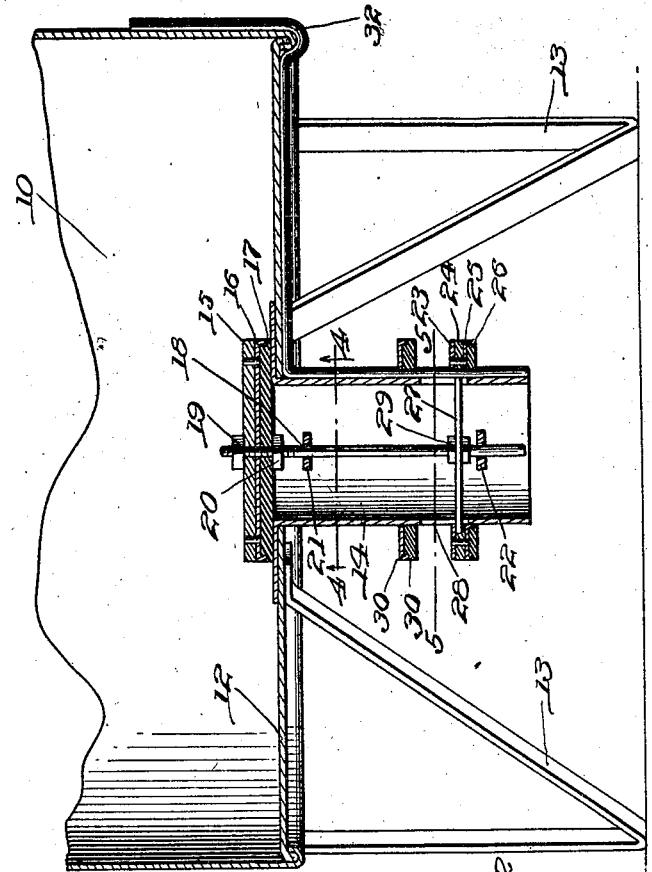
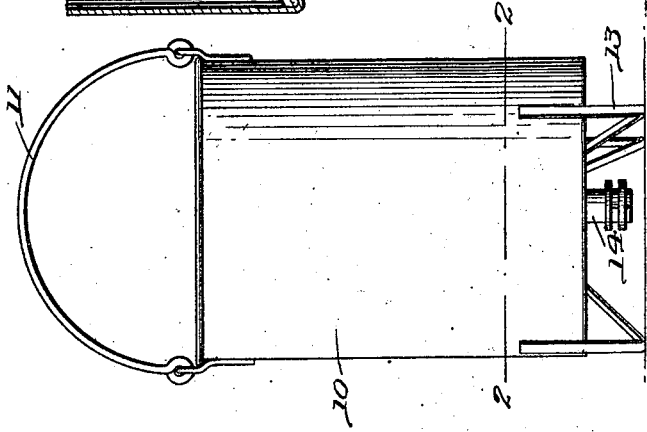
Charles N. Brackett
INVENTOR
BY Victor J. Evans
ATTORNEY
WITNESS:

May 8, 1923.

C. N. BRACKETT

FILLING DEVICE

Filed Nov. 14, 1921

Charles N. Brackett.
INVENTOR

BY Victor J. Evans
ATTORNEY

WITNESS:

Patented May 8, 1923.

1,454,208

UNITED STATES PATENT OFFICE.

CHARLES N. BRACKETT, OF MEMPHIS, TENNESSEE.

FILLING DEVICE.

Application filed November 14, 1921. Serial No. 515,127.

*To all whom it may concern:*

Be it known that I, CHARLES N. BRACKETT, a citizen of the United States, residing at Memphis, in the county of Shelby and State of Tennessee, have invented new and useful Improvements in Filling Devices, of which the following is a specification.

This invention comprehends the provision of a filling device, primarily intended for use in filling automobile radiators, in a manner to eliminate spilling of the water over the radiator and adjacent parts of the car, as well as the individual, the invention being susceptible for use in analogous capacities.

More specifically stated, the invention embodies amongst other features a liquid container from the bottom of which depends a filling spout having valved communication with the container, the valve being normally closed, and automatically opened when the weight of the container and its contents is supported by the device being filled.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views and wherein:—

Figure 1 is a side elevation of the device constructed in accordance with the present invention.

Figure 3 is an enlarged vertical sectional view through the filling spout and a portion of the container.

Figure 4:
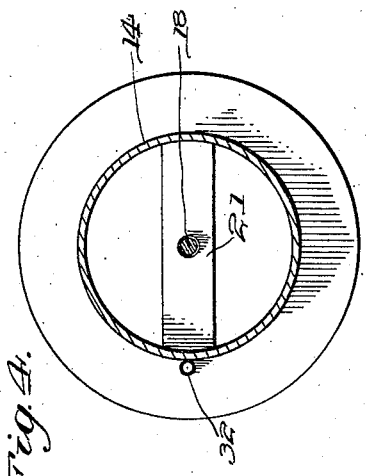
Figure 4 is a transverse sectional view taken on line 4—4 of Figure 3 with the supporting legs removed.
Figure 5:
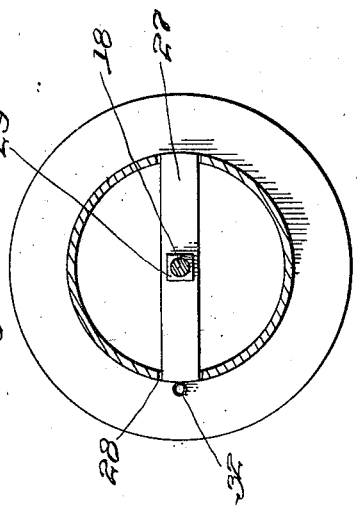
Figure 5 is a similar view taken on line 5—5 of Figure 3.
Figure 2:
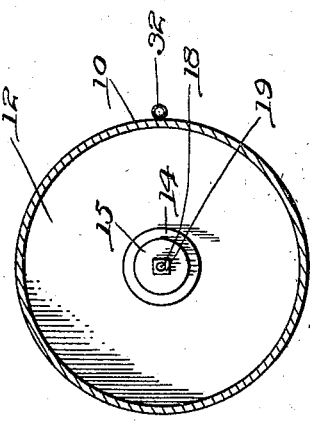
Figure 2 is a sectional view taken on line 2—2 of Figure 1, looking in the direction of the arrows.
Figure 6:
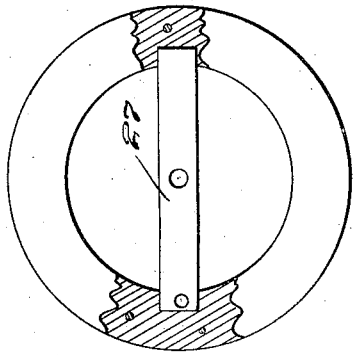
Figure 6 is a plan view partly in section of the movable annulus complete.

Referring to the drawings in detail, 10 indicates a container which may vary in size and configuration without departing from the spirit of the invention, and which may also be constructed from any suitable material. The container is equipped with a handle 11, while depending from the bottom 12 is a plurality of supporting legs 13. The bottom 12 is provided with a central opening, and from the wall of this opening is suspended a filling spout 14 which is of a size proportionate to the size of the container 10, the spout 14 terminating above the lower extremities of the supporting legs 13, so that when the container is placed at rest, the spout 14 is held in spaced relation to the objects upon which the container is arranged.

The spout 14 communicates with the container 10, but this communication is controlled by a valve to be presently described, the valve being normally closed to cut off the communication between the spout 14 and the container 10. This valve is in the nature of a disk which is made up of three parts or sections indicated at 15, 16 and 17 respectively. The section 15 is constructed of lead or other suitable material to afford the valve in its entirety the requisite weight to seat the valve and to hold the latter normally seated, the underside of the section 15 having secured thereto a metal section 16, to the underside of which is secured the section 17 which is preferably constructed of rubber to provide a leak proof joint or connection between the bottom of the container 10 and the spout 14. The respective sections of the valve are cemented or otherwise suitably secured together, each section being formed with an opening which receives a lifting rod 18 which passes through the spout 14 as illustrated. The valve in its entirety is held associated with the lifting rod 18 through the instrumentality of nuts 19 and 20 respectively which are threaded onto the rod 18 and arranged to bear against the upper and lower faces of the valve.

The lifting rod 18 is arranged to slide through upper and lower spindles 21 and 22 respectively which not only guides the rod in its movements, but also serves to brace the rod. These spindles are secured in any suitable manner to the interior of the filling spout 14 and arranged transversely therein.

Surrounding the spout 14 adjacent the lower end thereof is an annulus, preferably made up of a number of parts or sections indicated at 23, 24, 25 and 26 respectively. The section 24 is preferably constructed of lead, and is arranged between the metallic sections 23 and 25 respectively, while the lowermost metallic section 25 has secured thereto the section 26 which is preferably constructed of rubber. These sections are cemented or otherwise suitably secured together, and snugly embrace the spout 14 upon which they are mounted for sliding movement. The annulus in its entirety is suitably connected to the lifting rod 18, so that when the annulus is moved upwardly upon the spout 14, the valve above mentioned is elevated within the container 10, thus establishing communication between the container and the discharge spout 14. While the annulus may be connected to the lifting rod in any suitable manner, I preferably make use of a transverse element 27 which has its terminals embedded in the annulus, or in other words, arranged between two of the respective sections thereof, the transverse element passing through alined slots 28 formed in the spout 14 at diametrically opposite points. The lift rod passes through the transverse element 27, while associated with the lifting rod are spaced nuts 29 which are utilized to hold the annulus fixed to the lifting rod, to impart movement thereto when the said annulus is raised or lowered in a manner to be presently described.

Surrounding the spout 14 is an annulus, preferably made up of two associated sections 30 and 31 respectively, the section 30 being metal, and cemented or otherwise suitably secured to the section 31 which is constructed of rubber. This particular annulus is arranged stationary on the spout 14 and spaced a predetermined distance above the movable annulus, constituting a stop for the latter to limit the opening movement of the valve.

A vent pipe indicated at 32 extends from the bottom of the spout 14 up to the underside of the bottom 12 of the container and thence bent outwardly to the edge of the container, as at 33 and thence upwardly a short distance as shown. This pipe permits of the escape of air from the device being filled.

In practice, assuming that the device is to be used for the purpose of filling automobile radiators, the container 10 is filled with water, and the communication between the container 10 and the filling spout 14 normally closed by the valve above described. The container is lifted and arranged above the radiator (not shown) with the filling spout positioned within the filling tube of the radiator, and the weight of the container and its contents supported by the movable annulus which reposes upon the filling tube of the radiator. Consequently, when the movable annulus is moved upwardly on the spout 14, the valve above referred to is opened, allowing the contents of the container to flow into the radiator until the latter has been filled, eliminating spilling of the water over the radiator, the adjacent parts of the vehicle, or the individual using the device. As above stated, the air is allowed to escape through the pipe 32.

When the container is lifted from the radiator, the valve gravitates to its normally closed position. As above stated, the device may vary in size so as to permit of its use in analogous capacities, for instance, in filling jars, bottles or the like.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

A filling device of the character described comprising a container having an opening centrally disposed in its bottom portion, a filling spout suspended from the walls of said opening and adapted to communicate with the interior of said container, a valve normally seated to cut off said communication and adapted to have its lower edge normally engaging the edges surrounding the opening, said valve including segments of different material arranged in superimposed positions, the heaviest of which being rust resisting and adapted to overlie the others, the intermediate material being rigid, the bottom material being pliable and adapted to provide a leak proof joint between the bottom of the container and the spout, a lifting rod having one of its ends inserted centrally through and beyond the valve and having said end threaded, nuts mounted on said threads and adapted to engage the upper and lower portion of said valve and to hold the same detachably secured to the rod spaced guide means secured to the interior of the filling spout and arranged transversely therein adjacent each end, said rod being adapted to slide centrally through said guide means, an annulus composed of the same material as the valve and adapted to loosely surround the filling spout adjacent its lower edge, a transverse element detachably secured to said rod and having its ends arranged in diametrically opposed elongated slots provided in the filling spout, said ends being adapted to support the annulus in desired positions, a second annulus rigidly secured around the filling spout and having its bottom edge engaging the top edge of said elongated slot and to limit the movement of the first mentioned annulus as and for the purpose specified.

In testimony whereof I affix my signature.

CHARLES N. BRACKETT.